United States Patent
Combes et al.

(10) Patent No.: US 10,746,100 B2
(45) Date of Patent: Aug. 18, 2020

(54) COMPACT HEAT EXCHANGE DEVICE INCORPORATED INTO AN AIRCRAFT PYLON

(71) Applicant: Airbus Operations (S.A.S.), Toulouse (FR)

(72) Inventors: Stéphane Combes, Buzet sur Tarn (FR); Jean Geliot, Toulouse (FR); Thomas Deforet, Toulouse (FR); Adeline Soulie, Verdun sur Garonne (FR); Benoit Orteu, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 150 days.

(21) Appl. No.: 16/129,499

(22) Filed: Sep. 12, 2018

(65) Prior Publication Data

US 2019/0085770 A1   Mar. 21, 2019

(30) Foreign Application Priority Data

Sep. 14, 2017   (FR) ..................................... 17 58521

(51) Int. Cl.
*F01N 5/02* (2006.01)
*F02C 7/18* (2006.01)
(Continued)

(52) U.S. Cl.
CPC ................ *F02C 7/18* (2013.01); *B64D 13/08* (2013.01); *B64D 27/12* (2013.01); *B64D 33/08* (2013.01);
(Continued)

(58) Field of Classification Search
CPC ........... F02C 7/18; B64D 13/08; B64D 27/12; B64D 33/08; F05D 2220/323; F05D 2260/213; F05D 2260/232
(Continued)

(56) References Cited

U.S. PATENT DOCUMENTS 1,733,770 A * 10/1929 Andrake ................ B21D 53/00
                                                                  29/462
5,114,100 A *  5/1992 Rudolph ................. B64C 21/06
                                                                  244/130
(Continued)

FOREIGN PATENT DOCUMENTS

| EP | 2476881 A2 | 7/2012 |
| EP | 3048047 A1 | 7/2016 |
| EP | 3456633 B1 | 1/2020 |

OTHER PUBLICATIONS

French Search Report for French Application No. 1758521 dated May 4, 2018.

*Primary Examiner* — Claire E Rojohn, III
(74) *Attorney, Agent, or Firm* — Jenkins, Wilson, Taylor & Hunt, P.A.

(57) ABSTRACT

A heat exchange device to be positioned in an aircraft pylon and including a heat exchanger and an obturator to adopt a closed state where it prevents flow of air from flowing through the heat exchanger, and more- or less-permissive states where it allows flow of air to flow with a higher or lower flow rate. The obturator includes slats each including a pivot axis, the pivot axes of the various slats being mutually parallel and intersecting the direction of the flow of air, the slats being simultaneously mobile in rotation about their pivot axis between a closed position in which the slats are contiguous, which corresponds to the closed state of the obturator, and an open position in which the slats are spread apart, which corresponds to the permissive state of the obturator.

8 Claims, 2 Drawing Sheets

(51) Int. Cl.
*B64D 13/08* (2006.01)
*B64D 27/12* (2006.01)
*B64D 33/08* (2006.01)
*F02C 7/20* (2006.01)

(52) U.S. Cl.
CPC .......... *F02C 7/20* (2013.01); *F05D 2220/323* (2013.01); *F05D 2260/213* (2013.01); *F05D 2260/232* (2013.01)

(58) Field of Classification Search
USPC .......................................................... 165/51
See application file for complete search history.

(56) References Cited

U.S. PATENT DOCUMENTS

| | | | | |
|---|---|---|---|---|
| 5,137,230 | A * | 8/1992 | Coffinberry | B64C 21/06 244/118.5 |
| 5,704,218 | A * | 1/1998 | Christians | B64D 13/06 62/172 |
| 6,189,324 | B1 * | 2/2001 | Williams | B64D 13/06 62/172 |
| 7,607,308 | B2 * | 10/2009 | Kraft | F02C 6/08 60/226.1 |
| 9,062,604 | B2 * | 6/2015 | DeFrancesco | B64D 13/08 |
| 10,036,273 | B2 * | 7/2018 | Kozuch | F01D 5/02 |
| 10,473,037 | B2 * | 11/2019 | Ortiz | F02C 7/18 |
| 10,519,963 | B2 * | 12/2019 | Taylor | F01D 17/145 |
| 10,533,501 | B2 * | 1/2020 | Taylor | F01D 25/12 |
| 10,556,693 | B2 * | 2/2020 | Bombled | B64D 13/02 |
| 2009/0000305 | A1 * | 1/2009 | Porte | F02C 7/141 60/782 |
| 2010/0288890 | A1 * | 11/2010 | Gatzke | B64D 13/08 244/53 R |
| 2013/0092462 | A1 * | 4/2013 | Chinta | B60K 11/085 180/68.1 |
| 2016/0214722 | A1 * | 7/2016 | McAuliffe | B64D 13/06 |
| 2017/0260905 | A1 * | 9/2017 | Schmitz | F28F 13/06 |
| 2017/0292473 | A1 * | 10/2017 | Stretton | F02K 1/766 |
| 2018/0372006 | A1 * | 12/2018 | Chalaud | F02C 7/232 |
| 2019/0161198 | A1 * | 5/2019 | Combes | F16C 11/045 |
| 2019/0226400 | A1 * | 7/2019 | Geliot | B64D 13/08 |
| 2019/0338704 | A1 * | 11/2019 | Geliot | F01D 17/105 |

* cited by examiner

COMPACT HEAT EXCHANGE DEVICE INCORPORATED INTO AN AIRCRAFT PYLON

CROSS-REFERENCE TO RELATED APPLICATION

This application claims the benefit of and priority to French patent application number 17 58521 filed on Sep. 14, 2017, the entire disclosure of which is incorporated by reference herein.

TECHNICAL FIELD

The present disclosure relates to a compact heat exchange device incorporated into an aircraft pylon.

BACKGROUND

According to a configuration shown in FIGS. 1 and 2, an aircraft 10 comprises multiple engine assemblies 12 positioned beneath the wing 14. As shown in FIG. 2, an engine assembly 12 comprises:
  an engine 16 in which flows a core air flow,
  a nacelle 18 positioned around the engine 16 so as to delimit, with the latter, an annular duct in which flows a bypass flow of cold air, and
  a pylon 20 which provides the connection between the engine 16 and the wing 14.

The pylon 20 comprises a rigid primary structure 22 which, among other things, serves to transmit forces between the engine 16 and the rest of the aircraft 10, and a secondary structure 24 which encloses the primary structure 22 and reduces the drag of the pylon 20.

As shown in FIGS. 2 and 3, each engine assembly 12 comprises at least one heat exchange device 26 configured to cool hot air which is taken from the compression stages of the engine 16 and is destined for the systems for air-conditioning and pressurization of the aircraft, and/or for de-icing of the wing. According to one embodiment, each heat exchange device 26 comprises:
  a heat exchanger 28 which is parallelepipedal in shape and which has a first hot air circuit connecting a first inlet 30 and a first outlet 32, and a second cold air circuit connecting a second inlet 34 and a second outlet 36,
  a hot air supply duct 38 which is configured to take hot air from the engine 16 and is connected to the first inlet 30,
  a hot air outlet duct 40 connected to the first outlet 32,
  a cold air supply duct 42 which is configured to take cold air from the bypass flow and is connected to the second inlet 34,
  an exhaust duct 44 which is configured to eject air outside the aircraft and is connected to the second outlet 36.

In order to regulate the temperature of the hot air, the heat exchange device 26 comprises a regulating system 46 that is configured to adjust the flow rate of the cold air and is positioned upstream of the heat exchanger 28, at the cold air supply duct 42.

This regulating system 46 comprises:
  an obturator (not shown) which is positioned inside the cold air supply duct 42 and is mobile in rotation about a transverse pivot axis (which extends across a diameter of the cold air supply duct 42), between a closed position in which it blocks the cold air supply duct 42 and more- or less-open positions in which it allows a flow of air with a lower or higher flow rate to flow in the cold air supply duct 42,
  an actuator 48 which is configured to control the position of the obturator and which comprises an output shaft 50 coupled to the pivot axis of the obturator.

The heat exchanger 28 and the regulating system 46 are positioned in a region located above the primary structure 22 and beneath the secondary structure 24 of the pylon.

The obturator must be positioned at a portion of the cold air supply duct 42 of essentially constant cross section so as to allow it to pivot. Therefore, the obturator is remote from the heat exchanger 28, which tends to increase the space required for the heat exchange device.

The actuator 48 and its output shaft 50 are positioned along a direction perpendicular to the direction of the cold air supply duct 42, which also tends to increase the space required for the heat exchange device.

However, aircraft engines have ever larger diameters and are positioned as close as possible to the wing in order to improve aerodynamic performance and to maintain a minimum ground clearance. Consequently, the region located above the primary structure 22 and beneath the secondary structure 24 of the pylon is evermore restricted, which tends to complicate the integration of the heat exchange device.

The disclosure herein aims to remedy some or all of the drawbacks of the prior art.

SUMMARY

To that end, the disclosure herein relates to a heat exchange device configured to be positioned in an aircraft pylon and comprising:
  a heat exchanger which comprises a first hot air circuit connecting a first inlet and a first outlet, and a second cold air circuit connecting a second inlet and a second outlet that is extended by an exhaust duct,
  a regulating system that is configured to adjust a flow rate of a flow of air flowing in the second cold air circuit of the heat exchanger, and that comprises:
    an obturator configured to adopt a closed state in which it prevents the flow of air from flowing, and more- or less-permissive states in which it allows the flow of air to flow with a higher or lower flow rate,
    an actuator configured to control the state of the obturator.

According to the disclosure herein, the obturator comprises a plurality of slats, each of the slats comprising a pivot axis, the pivot axes of the various slats being mutually parallel and intersecting the direction of the flow of air, the slats being simultaneously mobile in rotation about their pivot axis between a closed position in which the slats are contiguous, which corresponds to the closed state of the obturator, and an open position in which the slats are spread apart, which corresponds to the permissive state of the obturator.

Providing multiple slats makes it possible to reduce the thickness of the obturator and to bring it as close as possible to the heat exchanger. This produces a compact assembly.

According to another feature, the obturator is positioned downstream of the heat exchanger.

According to one configuration,
  the second outlet of the heat exchanger has a square or rectangular cross section,
  the obturator comprises a frame positioned between the second outlet and the exhaust duct, the frame having two longitudinal walls and two transverse walls while having a passage cross section essentially identical to that of the second outlet of the heat exchanger, and the ends of the pivot axes of the slats are mounted so as to be able to pivot with respect to the longitudinal walls of the frame.

According to another feature, the obturator comprises, for each slat, an arm extending in a direction perpendicular to the pivot axis and having a first end rigidly connected to one of the ends of the pivot axis of the slat, all the arms of the various slats being connected to a single bar which is connected to the actuator.

According to one configuration, the actuator is configured to displace the bar in a displacement direction which is approximately parallel to a portion of a supply duct connected to the first inlet and/or a portion of a hot air outlet duct connected to the first outlet, the bar and the actuator being arranged in a direction parallel to the displacement direction.

The disclosure herein also relates to an aircraft pylon and to an aircraft which comprise a heat exchange device according to the disclosure herein.

BRIEF DESCRIPTION OF THE DRAWINGS

Other characteristics and advantages will emerge from the following description of the disclosure herein, which description is given solely by way of example, with reference to the appended drawings in which.

DETAILED DESCRIPTION

Figure 1:
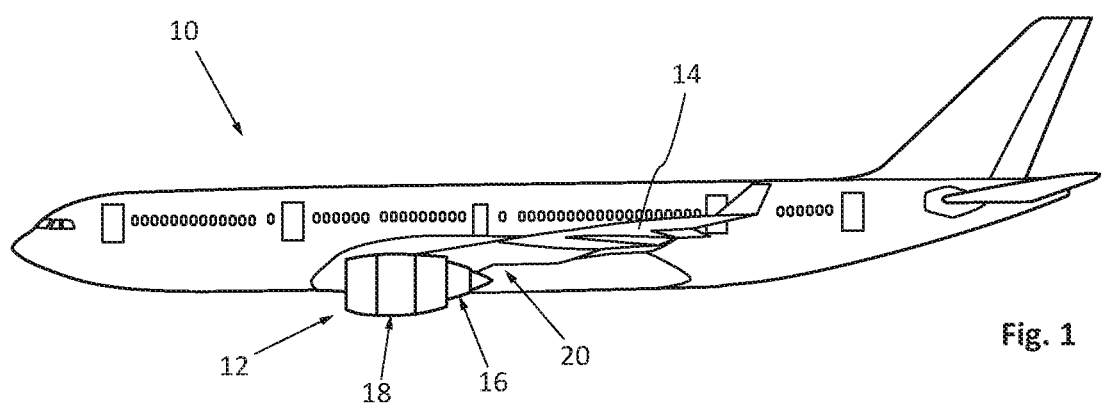
FIG. 1 is a side view of an aircraft.
Figure 2:
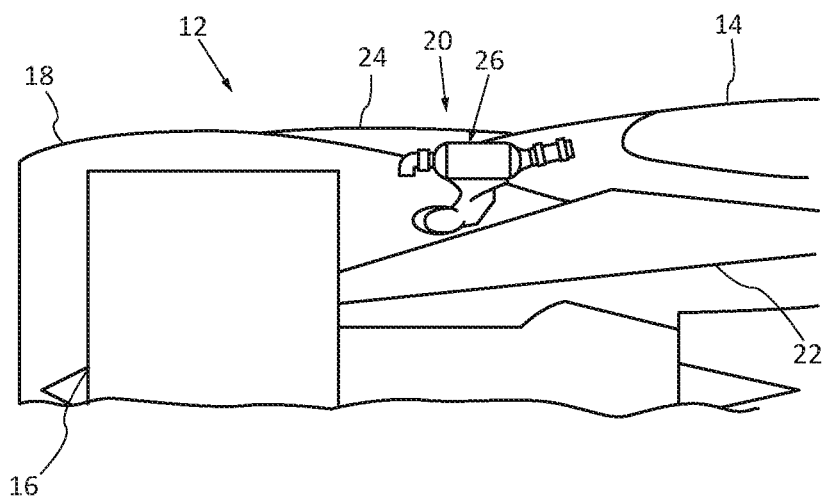
FIG. 2 is a side view of part of an engine assembly, illustrating an embodiment of the prior art.
Figure 3:
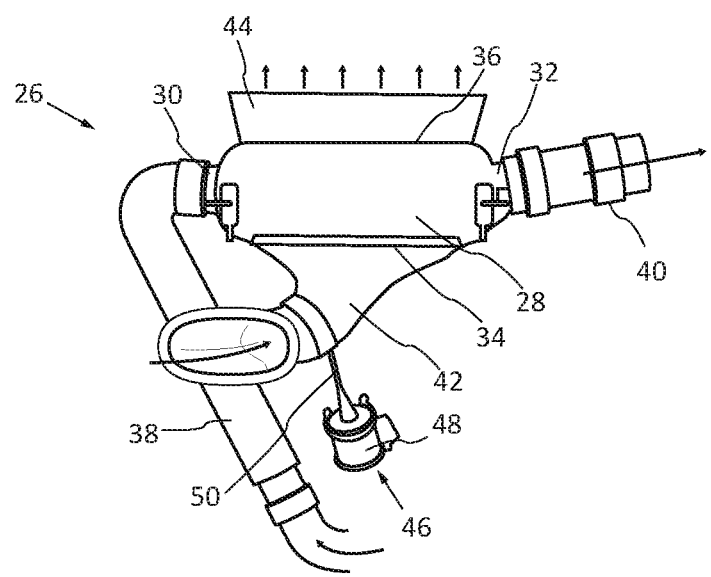
FIG. 3 is a side view of a heat exchange device, illustrating an embodiment of the prior art.
Figure 4:
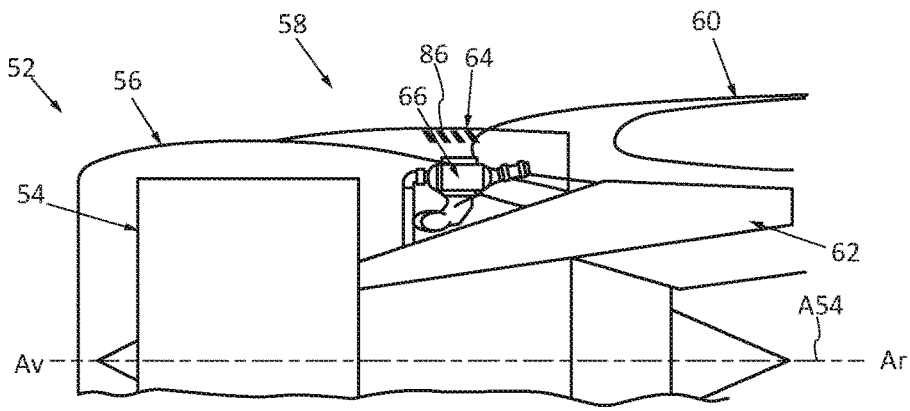
FIG. 4 is a side view of part of an engine assembly, illustrating an embodiment of the disclosure herein.

FIG. 4 shows an engine assembly 52 which comprises:
an engine 54 in which flows a core air flow,
a nacelle 56 positioned around the engine 54 so as to delimit, with the latter, an annular duct in which flows a bypass flow of cold air, an
a pylon 58 which provides the connection between the engine 56 and a wing 60 of an aircraft.

The pylon 58 comprises a rigid primary structure 62 which, among other things, serves to transmit forces between the engine 54 and the rest of the aircraft, and a secondary structure 64 which encloses the primary structure 62 and reduces the drag of the pylon 58.

A more detailed description of all these elements of the engine assembly is not given, since they can be identical to those of the prior art.

For the remainder of the description, a longitudinal direction is a direction parallel to the engine axis A54. A transverse plane is a plane perpendicular to the longitudinal direction. A horizontal longitudinal plane is a plane parallel to the horizontal and longitudinal direction. A vertical longitudinal plane is a plane parallel to the vertical and longitudinal direction. The terms front and rear referred to the direction of flow of the flows of air inside the engine 54, which enter at the front Av of the engine 54 and exit at the rear Ar of the engine 54.

At least one engine assembly 52 comprises at least one heat exchange device 66 configured to cool hot air which is taken from the compression stages of the engine 54 and is destined for the systems for air-conditioning and pressurization of the aircraft, for de-icing of the wing and/or for any other system of the aircraft.

Figure 5:
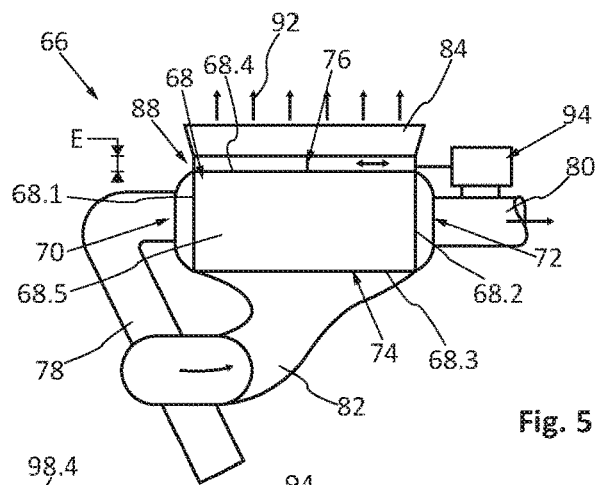
FIG. 5 is a side view of a heat exchange device, illustrating an embodiment of the disclosure herein.
Figure 6:
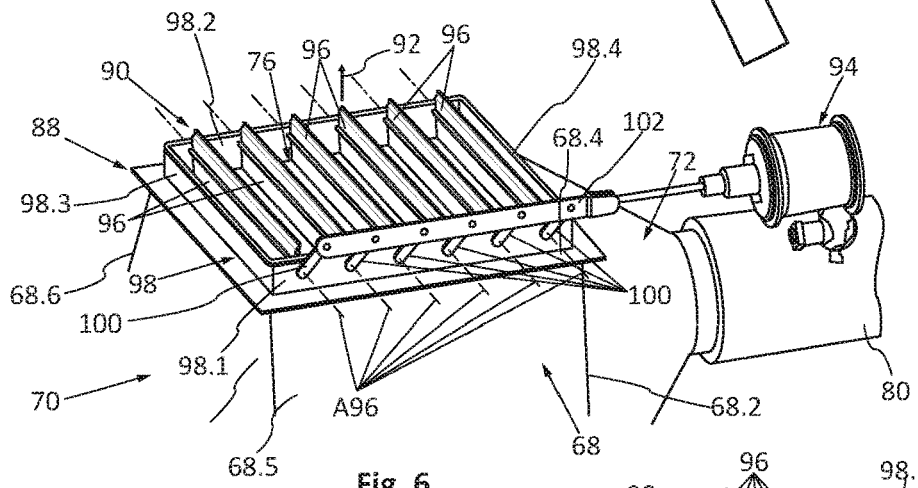
FIGS. 6 and 7 are perspective views of a heat exchanger equipped with a regulating system that illustrates an embodiment of the disclosure herein, respectively in the open position and in the closed position.
Figure 7:
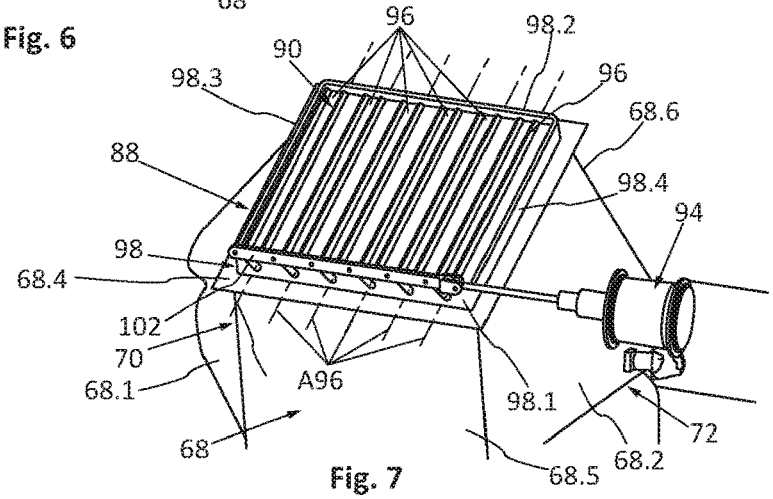

According to one embodiment, shown in FIGS. 5 through 7, each heat exchange device 66 comprises a heat exchanger 68 which is parallelepipedal in shape and which has a front face 68.1 oriented towards the front Av of the engine 54, a rear face 68.2 oriented towards the rear Ar of the engine 54, a lower horizontal longitudinal face 68.3, an upper horizontal longitudinal face 68.4, a right-hand vertical longitudinal face 68.5 and a left-hand vertical longitudinal face 68.6.

The heat exchanger 68 comprises a first hot air circuit, connecting a first inlet 70 positioned on the front face 68.1 and a first outlet 72 positioned on the rear face 68.2, and a second cold air circuit, connecting a second inlet 74 positioned on the lower horizontal longitudinal face 68.3 and a second outlet 76 positioned on the upper horizontal longitudinal face 68.4.

The second outlet 76 of the heat exchanger 68 has a square or rectangular cross section.

The heat exchange device 66 also comprises:
a hot air supply duct 78 which is configured to take hot air from the engine 54 and is connected to the first inlet 70,
a hot air outlet duct 80 connected to the first outlet 72,
a cold air supply duct 82 which is configured to take cold air from the cold air bypass flow and is connected to the second inlet 74,
an exhaust duct 84 which is configured to eject air outside the aircraft via at least one outlet grille 86 and is connected to the second outlet 76.

The hot air supply duct 78, the hot air outlet duct 80, the cold air supply duct 82 and the exhaust duct 84 are not set out in greater detail since they can be identical to those of the prior art.

The heat exchange device comprises a regulating system 88 that is configured to adjust the flow rate of a flow of air 92 flowing in the second cold air circuit of the heat exchanger 68.

This regulating system 88 comprises:
an obturator 90 configured to adopt a closed state in which it prevents the flow of air 92 from flowing, and more- or less-permissive states in which it allows the flow of air 92 to flow with a higher or lower flow rate,
an actuator 94 configured to control the position of the obturator 90.

According to one feature of the disclosure herein, the obturator 90 is positioned downstream of the heat exchanger 68, at the upper longitudinal face 68.4, and it is configured to block the second outlet 76 of the heat exchanger 68. Positioning the obturator 90 downstream of the heat exchanger 68 makes it possible to reduce the distance between the region of taking the cold air from the bypass flow and the heat exchanger 68.

According to one feature of the disclosure herein, the obturator 90 comprises a plurality of slats 96, each of the slats 96 comprising a pivot axis A96, the pivot axes A96 of the various slats being mutually parallel and intersecting the direction of the flow of air 92, the slats 96 being simultaneously mobile in rotation about their pivot axis A96 between a closed position in which the slats 96 are contiguous, which corresponds to the closed state of the obturator 90, and an open position in which the slats 96 are spread apart to a greater or lesser extent, which corresponds to the more- or less-permissive state of the obturator 90.

Providing multiple slats 96 makes it possible to reduce the thickness E of the obturator 90 and to bring it as close as possible to the heat exchanger 68. This produces a compact assembly.

According to one configuration, the pivot axes A96 are parallel to the upper horizontal longitudinal face 68.4 of the heat exchanger 68 and are coplanar. Thus, in the closed position, the slats 96 are approximately in the horizontal position, as shown in FIG. 7, and in the fully permissive state (maximum flow rate), the slats 96 are approximately in the vertical position, as shown in FIG. 6.

Each slat 96 is rectangular and its pivot axis A96 is positioned on a bisector parallel to the long side of the rectangle.

The slats 96 are all identical and the pivot axes A96 are spaced apart by a distance such that, in the closed position, the slats are contiguous, and preferably overlap slightly.

In one embodiment, the obturator 90 comprises a frame 98 having four lateral walls parallel to the flow of air 92, two longitudinal walls 98.1, 98.2 parallel to the longitudinal direction and two transverse walls 98.3, 98.4 perpendicular to the longitudinal direction.

The frame 98 has a passage cross section essentially identical to that of the second outlet 76 of the heat exchanger 68, and it is positioned between the second outlet 76 and the exhaust duct 84 in order to channel the flow of air 92 between the heat exchanger 68 and the exhaust duct 84.

The ends of the pivot axes A96 of the slats 96 are supported by the longitudinal walls 98.1 and 98.2 of the frame 98. To that end, each longitudinal lateral wall 98.1, 98.2 comprises, for each end of the pivot axes A96, an orifice that fits the pivot axis such that each slat 96 can pivot with respect to the longitudinal walls 98.1 and 98.2 of the frame 98.

The length of each slat 96 is essentially equal to the distance between the longitudinal walls 98.1, 98.2 of the frame, and the width of each slat 96 is very slightly greater than the distance between the pivot axes A96.

The obturator comprises, for each slat, an arm 100 extending in a direction perpendicular to the pivot axis A96 and having a first end rigidly connected to one of the ends of the pivot axis A96 of the slat 96 and a second end pivotably connected to a bar 102. The arms 100 are positioned outside the frame 98.

In order to ensure simultaneous movement of all the slats 96, all of the arms 100 of the various slats 96 are connected to the same bar 102, which is connected to the actuator 94.

The actuator 94 is configured to displace the bar 102 in a displacement direction which is approximately parallel to the longitudinal direction, between a first position corresponding to the open state of the obturator 90, as shown in FIG. 6, and a second position corresponding to the closed state of the obturator 90, as shown in FIG. 7.

According to one feature of the disclosure herein, the bar 102 and the actuator 94 are arranged in a direction that is parallel to the displacement direction, which is approximately parallel to a portion of a supply duct 78 connected to the first inlet 70 and/or a portion of a hot air outlet duct 80 connected to the first outlet 72. Thus, the actuator 94 can be affixed, and possibly connected, to that portion of the supply duct 78 that is connected to the first inlet 70 and/or to that portion of the hot air outlet duct 80 that is connected to the first outlet 72. This configuration contributes to obtaining a compact assembly.

Obtaining a more compact heat exchange device makes possible to move this device away from the wing, and consequently to reduce the effect on the wing of the air exiting via the outlet grille 86.

By virtue of its position, the obturator is more easily accessible for maintenance. Indeed, access is by removal of the outlet grille 86.

Finally, the disclosure herein is not limited to the positioning of the heat exchanger 68 and of the obturator 90 above the primary structure of the pylon. By virtue of its very compact design, the assembly consisting of the heat exchanger 68 and the obturator 90 may be positioned in the primary structure of the pylon or below the primary structure of the pylon.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heat exchange device configured to be positioned in an aircraft pylon and comprising:
    a heat exchanger which comprises a first hot air circuit connecting a first inlet and a first outlet, and a second cold air circuit connecting a second inlet and a second outlet that is extended by an exhaust duct;
    a regulating system configured to adjust a flow rate of a flow of air flowing in the second cold air circuit of the heat exchanger, and that comprises:
        an obturator configured to adopt a closed state in which the obturator prevents the flow of air from flowing, and permissive states in which the obturator allows the flow of air to flow with a higher or lower flow rate; and
        an actuator configured to control a state of the obturator,
    wherein the obturator comprises a plurality of slats, each of the slats comprising a pivot axis, the pivot axes of the slats being mutually parallel and intersecting a direction of the flow of air, the slats being simultaneously mobile in rotation about their pivot axis between a closed position in which the slats are contiguous, which corresponds to the closed state of the obturator, and an open position in which the slats are spread apart, which corresponds to the permissive state of the obturator.

2. The heat exchange device according to claim 1, wherein the obturator is positioned downstream of the heat exchanger.

3. The heat exchange device according to claim 2, wherein the second outlet of the heat exchanger has a square or rectangular cross section,
    wherein the obturator comprises a frame positioned between the second outlet and the exhaust duct, the frame having two longitudinal walls and two transverse walls while having a passage cross section essentially identical to that of the second outlet of the heat exchanger, and wherein ends of the pivot axes of the slats are mounted so as to be able to pivot with respect to the longitudinal walls of the frame.

4. The heat exchange device according to claim 1, wherein the obturator comprises, for each slat, an arm extending in a direction perpendicular to the pivot axis and having a first end rigidly connected to one of the ends of the pivot axis of the slat, all the arms of the various slats being connected to a single bar which is connected to the actuator.

5. The heat exchange device according to claim 1, wherein the actuator is configured to displace the bar in a displacement direction which is approximately parallel to a portion of a supply duct connected to the first inlet, the bar and the actuator being arranged in a direction parallel to the displacement direction.

6. The heat exchange device according to claim 4, wherein the actuator is configured to displace the bar in a displacement direction which is approximately parallel to a portion of a hot air outlet duct connected to the first outlet, the bar and the actuator being arranged in a direction parallel to the displacement direction.

7. An aircraft pylon comprising a heat exchange device configured to be positioned in an aircraft pylon, the heat exchange device comprising:

a heat exchanger which comprises a first hot air circuit connecting a first inlet and a first outlet, and a second cold air circuit connecting a second inlet and a second outlet that is extended by an exhaust duct;

a regulating system configured to adjust a flow rate of a flow of air flowing in the second cold air circuit of the heat exchanger, and that comprises:

an obturator configured to adopt a closed state in which the obturator prevents the flow of air from flowing, and permissive states in which the obturator allows the flow of air to flow with a higher or lower flow rate; and an actuator configured to control a state of the obturator, wherein the obturator comprises a plurality of slats, each of the slats comprising a pivot axis, the pivot axes of the slats being mutually parallel and intersecting a direction of the flow of air, the slats being simultaneously mobile in rotation about their pivot axis between a closed position in which the slats are contiguous, which corresponds to the closed state of the obturator, and an open position in which the slats are spread apart, which corresponds to the permissive state of the obturator.

8. An aircraft comprising an aircraft pylon according to claim 7.

* * * * *